United States Patent [19]

Staron

[11] 4,377,292
[45] Mar. 22, 1983

[54] CHUCK ASSEMBLY AND COLLET

[75] Inventor: John C. Staron, Melrose Park, Ill.

[73] Assignee: The Bendix Corporation, Southfield, Mich.

[21] Appl. No.: 219,183

[22] Filed: Dec. 22, 1980

Related U.S. Application Data

[63] Continuation of Ser. No. 2,119, Jan. 9, 1979, abandoned.

[51] Int. Cl.³ .......................... B23B 31/04; B23C 5/26
[52] U.S. Cl. ..................................... 279/46 R; 279/52; 279/82; 408/239 R; 409/234
[58] Field of Search ................. 409/232, 234; 279/46, 279/47, 48, 49, 50, 51, 52, 53, 54, 82, 83; 63/5 R; 408/239, 239 A

[56] References Cited

U.S. PATENT DOCUMENTS

| | | | |
|---|---|---|---|
| 1,546,606 | 12/1925 | Mealy | 63/5 R |
| 3,195,909 | 7/1965 | Winnen | 279/51 |
| 3,425,705 | 2/1969 | Benjamin et al. | 279/56 |
| 3,546,761 | 12/1970 | Gage . | |
| 3,556,540 | 1/1971 | Benjamin et al. | 279/47 |
| 3,618,962 | 11/1971 | Cox et al. | 279/82 |
| 4,146,239 | 3/1979 | Martin | 279/77 |

Primary Examiner—Z. R. Bilinsky
Attorney, Agent, or Firm—Kenneth A. Seaman

[57] ABSTRACT

The chuck assembly and the collet for retaining an end mill tool against axial pullout. The collet includes a radially compressible body having a tapered outer surface, a central bore and a radial aperture extending from the outer surface into the central bore. The radial aperture has an undercut or larger diameter medial portion with a movable pin mounted therein, said pin being movably mounted and, adapted to extend into the bore to retain the tool. The pin has a hole drilled through with a spring bar mounted therein. The ends of the spring bar are compressed to a length smaller than the diameter of the radial aperture and inserted into the larger undercut portions where the expansion of the spring bar retains the pin. The hole in the pin is larger than the diameter of the spring bar to allow the pin to move along its axis (radially into the collet bar). The pin has a lower chamfered end which is urged inwardly into the bore as the collet is tightened in the chuck assembly with the chamfered end engaging a rear bevel end on a flat surface on the tool to secure the tool within the collet, and whereby the pin can move outwardly to release the tool when the collet is removed from the chuck assembly.

6 Claims, 5 Drawing Figures

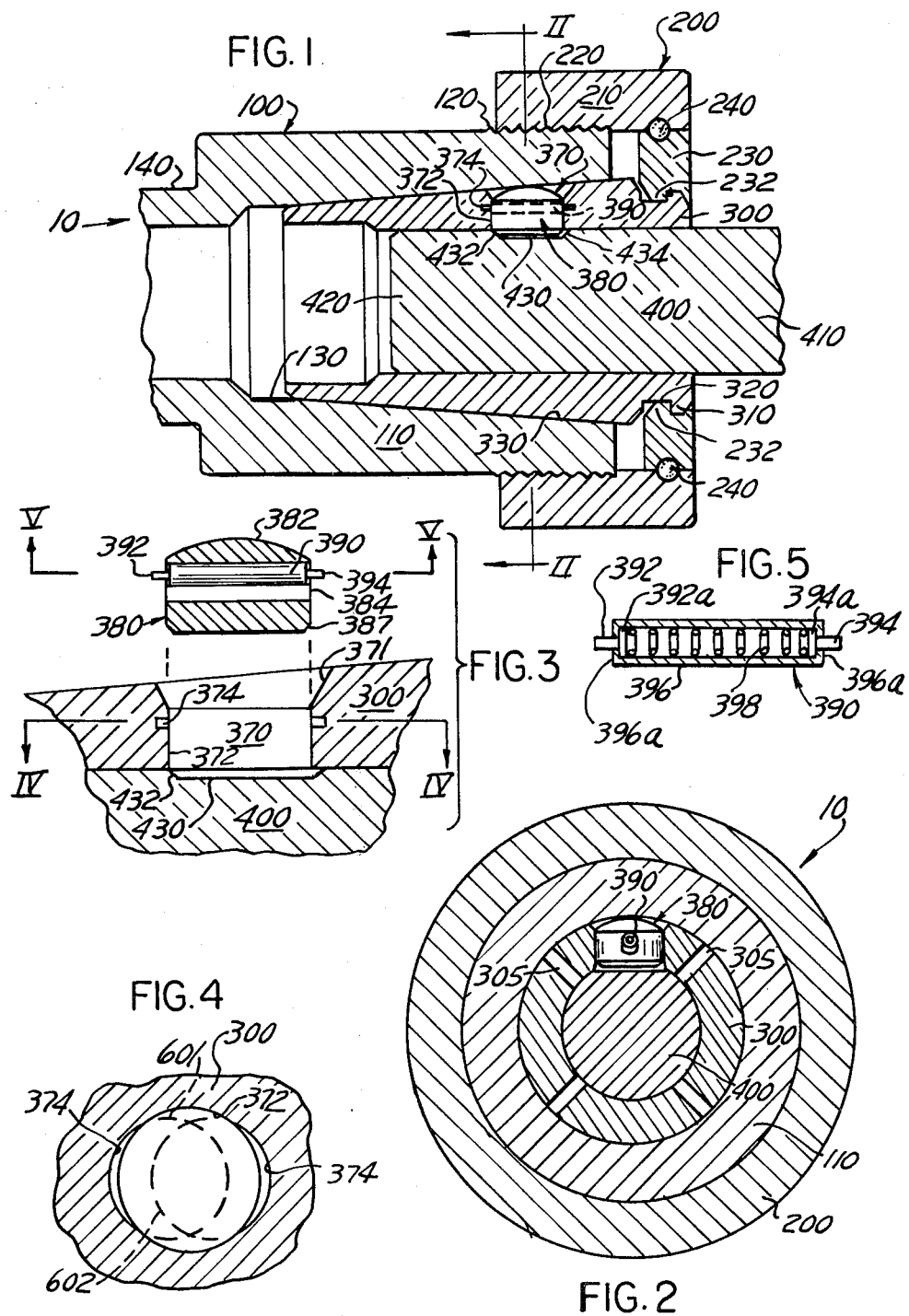

CHUCK ASSEMBLY AND COLLET

This is a continuation, of application Ser. No. 2,119, filed Jan. 9, 1979, now abandoned.

CROSS REFERENCE TO RELATED PATENTS

The present invention is related to and an improvement upon the invention disclosed in a patent application concurrently filed by Willard Cummings entitled "Chuck Assembly and Collet" and assigned to the assignee of the present application. This patent application, which is specifically incorporated herein by reference, is referenced to as the "Non-Pullout Collet Patent".

The present invention is also related to a patent application concurrently filed by Better and Lehde entitled "Slotted Collet and Method of Making" and assigned to the assignee of the present application. This patent application, which is also specifically incorporated herein by reference, is referred to as the "Slotted Collet Patent."

FIELD OF THE INVENTION

The present invention relates generally to a holding apparatus for cutting tools. More particularly, the present invention relates to a collet and chuck assembly for holding an end mill (or similar) tool to prevent axial or rotational movement with respect to the apparatus during machining.

An end mill tool is a cylindrical cutting tool which has a cutting (or milling) edges around the round portion at one or more of its ends along with cutting teeth on its end toward at least one of its forward ends. The tool has a generally cylindrical rear or central shank with at least one beveled-ended flat surface which is secured in the collet and chuck assembly during machining.

BACKGROUND ART

Various designs have been suggested for providing a collet and chuck assembly for securing an end mill tool therein against axial movement of the tool out of the assembly and against rotation of the tool with respect to the assembly and collet.

Such designs generally include an aperture through the collet, with a movable pin mounted therein for engaging a flat surface on the end mill shank. Mounting and retaining the pin suitably has been a problem in the prior art collets, except for the Non-Pullout Collet Patent discussed later. The pin should be easily movable to secure and release the tool, while resisting accidental separation of the pin from the collet. However, for service or repair, the pin should be quickly and easily released. Further, the mounting and retaining mechanism should not be on the external surface of the collet, to minimize the chance of damage thereto.

Cutting tools for chuck assemblies may range from only slightly smaller than the bore in the chuck to substantially smaller, with the thickness of the collet wall varying accordingly. An ideal collet for an end mill is not dependent on a particular wall thickness. More particularly, a very thin-walled collet (i.e., where the tool shank is almost as the chuck bore), must suitably accommodate the pin and its retention system, while allowing limited pin movement.

One approach suggested in the prior art was to provide the outer collet body and pin with a groove, in which an external spring retaining ring is mounted.

Another prior art approach was to drill a hole through the collet body perpendicular to and intersecting the pin aperture. The movable pin is provided with a hole also, and a roll pin is inserted into the aligned pin hole and collet body hole to retain the movable pin.

Typically, such designs have at least one of the following disadvantages: expensive to manufacture; time-consuming, difficult and/or expensive to assemble; parts, other than the collet body and the pin itself, which are on the external surface of the collet and subject to wear and destruction.

Examples of such collets are shown in U.S. Pat. Nos. 3,195,909; 3,425,705; 3,618,962; and others.

The collet design in the referenced Non-Pullout Collet Patent overcomes many of the disadvantages and limitations of the prior art. However, for thin-walled collets, the design in the Non-Pullout Collet Patent does not suffice. The pin and collet walls are simply shrunk to a thickness which does not allow an undercut and stepped radial aperture, respectively. To allow a radially-movably mounted pin.

It is thus apparent that there are disadvantages and limitations of the prior art collets for retaining an end mill tool. Lacking is a collet which is reliable and economical to manufacture, while quickly engaging and disengaging an end mill-type tool without external parts to be damaged. Other disadvantages and limitations of the prior art collets and chuck assemblies will be apparent from the following description of the present invention.

SUMMARY OF THE INVENTION

The present invention is a chuck assembly and collet which overcomes the limitations and disadvantages of the prior art collets previously described.

The present invention is a chuck assembly and collet which provides a convenient means for securing an end mill or similar tool when desired and for quickly and easily releasing it. The collet is relatively inexpensive to manufacture and assemble, easily and quickly assembled and has a minimum of external parts. The collet also has a high reliability and resistance to damage and to accidental separation of parts which could lead to a loss of parts. Further, the collet and chuck assembly of the present invention are equally useful in both thin and thick wall collets.

The chuck assembly includes a collet having a pin mounted in a radial aperture with an undercut extending therethrough with a spring bar mounted in the undercut. The spring bar, which has a free or no-force diameter slightly larger than the aperture portion and less than the medial undercut is inserted through the pin in the pin aperture, then the pin and spring bar assembly are inserted into the collet aperture with the spring bar in the undercut. The spring bar is compressed for insertion, then expands to retain the pin within the collet aperture. A pin aperture larger than the diameter of the spring bar allows the pin to move along its axis (radially with respect to the collet) to lock the tool shank therein.

The assembly of the present invention appears to be less expensive to manufacture than the design of the Non-Pullout Collet Patent.

The foregoing and other objects and advantages of the present invention will become apparent to one skilled in the art in view of the following description and claims and the accompanying drawings.

BRIEF DESCRIPTION OF THE DRAWINGS

FIG. 1 is a cross sectional view of a chuck assembly and collet of the present invention.

FIG. 2 is a cross sectional view of the chuck assembly and collet of FIG. 1, taken along the line II—II looking in the direction of the arrows.

FIG. 3 is an enlarged cross sectional view of a pin, spring bar and collet portion prior to assembly.

FIG. 4 is a cross sectional view of the collet portion of FIG. 3, taken along the line IV—IV looking in the direction of the arrows, with two positions of a cutting tool shown in phantom.

FIG. 5 is a cross sectional view of the preferred spring bar of the present invention.

DETAILED DESCRIPTION OF THE DRAWINGS

FIG. 1 shows a cross-sectional view of a part of a chuck assembly 10 of the present invention. The chuck assembly 10 includes a chuck body or collet holder 100 and a lock nut 200. A collet 300 is mounted within the collet holder 100 and has an end mill tool 400 mounted therein. The chuck assembly 10 and its components are the same as described in the referenced Non-Pullout Collet Patent except for a pin and aperture structure, which patent should be consulted for greater detail.

The collet holder 100 is of a well-known and conventional design and includes a body 110 with external forward screw threads 120 and an internal, inwardly tapering bore 130 extending rearwardly from the forward end of the body. A rear portion 140 is a shank which is configured to be secured in a machine tool or spindle.

The lock nut 200 is also a conventional design. The lock nut 200 includes a body 210 with internal threads 220 adapted to mate with the external threads 120 on the collet holder 100. A second member 230 of the lock nut 200 is coupled to the body 210 with ball bearings 240 and the member 230 has a projection 232, the purpose of which will be explained later.

The collet 300 is preferably made of an appropriate spring-type steel which has been hardened and drawn, as is well-known and customary in making collets. The collet has a body with an internal tool-receiving bore and with an outside external surface which tapers generally to a smaller rear diameter.

The external surface of collet 300 has a forward portion 310 and a tapering rear portion 330, separated by an annular groove 320. The rear portion 330 seats against and engages internal walls of the tapered holder bore 130 when the collet 300 is fully inserted. Preferably, two (or more) spatially-separated surfaces of the rear collet portion 330 are in contact with the bore 130 providing good engagement within the collet holder 100.

The lock nut projection 232 cooperates with the forward collet portion 310 and annular groove 320 to release the collet 300 from the collet holder bore 130 as the lock nut 200 is unscrewed in disassembly.

A radial aperture 370 extends through the collet 300 medially along the length of the collet. The aperture includes a first portion 372 and an undercut diameter 374 portion. A tool-securing pin 380 is positioned within the aperture 370 and is held in place by a spring bar 390.

The pin 380 has structure which is described in detail in connection with FIGS. 3 and 4. The pin 380 is radially movable through a limited range of radial movement when assembled, as also will be discussed later.

The spring bar 390 is shown in FIGS. 3 and 5 and will be discussed in greater detail in connection with those figures.

The tool 400 is a conventional tool (such as an end mill) which has forward cutting surfaces 410 and rear shank 420. The forward cutting surfaces 410 have side surfaces, as well as end surfaces, for cutting and may have a tendency for axial pullover. Therefore, the shank 420 of an end mill tool has one or more flat surfaces with forward and rear beveled ends 432, 434 for tool retention. The beveled ends 432, 434 have a 45° angle with respect to the axis of the tool. The beveled flat surface, when suitably engaged within the collet, prevents the tool from being pulled out of the holder.

FIG. 2 is a cross sectional view of the chuck assembly 10, showing the chuck body 110, the lock nut 200, the collet 300 and the tool 400. The collet 300 include slots 305 of the type described in the referenced Slotted Collet Patent to provide radial compressibility and resiliency alternatively, other slotting methods of providing radial compression and resiliency are known and could be used. The tool 400 has the flat surface 430 shown in this view slightly above the bottom of the tool locking pin 380. The spring bar 390 is shown in a side, cross sectional view.

FIG. 3 is an enlarged view of the pin 380, spring bar 390, aperture 370 and tool 400 prior to assembly of the pin into the aperture 370.

The pin 380 is generally cylindrically and includes a radiused or rounded head 382. A radial hole or aperture 384 extends through the pin below the head 382. The pin 380 has a lower chamfered portion 387 which has a 45° angle for engaging the 45° beveled surface 432 of the tool 400.

The spring bar 390 has ends 392, 394. The spring bar 390 is mounted within the hole 384 of the pin. The ends 392, 394 extend beyond the pin 380 normally, but may be compressed to a size no larger than the pin diameter. The ends 392, 394 are compressibly mounted to the spring bar 390 as discussed in FIG. 5. The hole 384 in the pin is larger than the diameter of the spring bar 390 to allow the pin 380 to move radially with respect to the collet 300 (up and down in FIG. 3) without movement of the spring bar 390. This movement allows the pin 380 to lock and release, as desired, the tool 400.

The aperture 370 has a chamfered entry 371, a portion 372 of generally uniform diameter and an undercut portion 374. The undercut portion 374 receives the ends 392, 394 of the spring bar 390 when the pin is inserted in the aperture 370.

FIG. 4 shows a cross sectional portion of the collet 300. The portion 372 of the aperture is shown, as is the undercut portions 374. The undercut portions 374 may be formed without requiring a separate setup of the collet 300 by using a Woodruff cutter and moving the collet 300 slightly back and forth when the Woodruff cutter is in place. Dotted lines 601, 602 show the extremes of the movement of the cutter to form the undercuts 374. Of course, other suitable methods of making the undercut could be employed to advantage.

FIG. 5 shows a cross sectional view of the spring bar 390 taken along the line V—V in FIG. 3. The spring bar 390 is preferably of the type used to mount a watch band to a watch and is available commercially from Polly Trading Co. (N.Y., N.Y), Gore fit or Regal. The spring bar 390 includes the ends 392, 394. The ends 392, 394 have enlarged portions 392a, 394a, respectively, which are held within a body 396. Ends 396a of the body are crimped over (or have other suitable retaining) to hold the ends 392, 394 in. A spring 398 urges the ends outward normally. The ends 392, 394 may be compressed or urged inwardly by compressing the spring 398.

The foregoing description of the preferred embodiment is merely exemplary of the present invention. The structure shown may be modified in one of several ways known to those skilled in the art, and further, some features of the present invention may be used without the corresponding use of other features. For example, other configurations of spring bars or spring members could be substituted, either with or without changes to the structure of the aperture of the pin. The collet aperture could be made in one of the several diverse manners. The pin might be of uniform size on its ends and need not be round. Accordingly, the present description is illustrative of the present invention only and should not be taken as limiting the scope of the invention which is solely by the following claims.

Having thus described the invention, what is claimed is:

1. A collet comprising:
    a radially resilient body having a tapered outer surface and a tool-receiving bore extending axially therethrough, said body having an aperture extending radially from the outer surface into said bore;
    a tool-securing pin having a head portion at one end thereof, and a tool-securing surface toward the other end thereof; and
    means for movably mounting the pin within the collet aperture, said means comprising:
    at least one undercut associated with the collet aperture providing a larger opening in the aperture mediate the collet bore and the collet outer surface, said undercut including an arcuate wall defined by a locus of lines parallel to said radial aperture and extending partially toward, but not communicating with, the outer surface of the collet;
    an aperture extending through the pin; and
    a compressible member for mounting the pin within the collet aperture, said member including telescoping end portions each mounted within the undercut and a medial portion extending through the pin aperture, with the pin aperture being larger than the medial portion of the member to allow limited movement of the pin for locking and releasing the tool within the collet, whereby the member is compressible for mounting the member in the undercut.

2. A collet of the type described in claim 1 wherein said undercut for mounting the compressible member within the collet aperture includes a pair of arcuately shaped recesses cut into, but not through, the collet body.

3. A collet of the type described in claim 2 wherein said arcuately shaped recesses are circular with a diameter smaller than the diameter of the collet aperture.

4. A collet for receiving and retaining a tool comprising:
    a radially resilient body having an outer surface and a tool-receiving bore extending axially therethrough, said body having an aperture extending radially from the outer surface into said bore;
    a tool-securing pin having a head portion at one end thereof, and a tool-securing surface toward the other end thereof for engaging the tool within the bore; and
    means for movably mounting the pin within the collet aperture, said means comprising:
    undercut portions associated with the collet aperture providing a larger opening in the aperture mediate the collet bore and the collet outer surface, said undercut portions each including an arcuate wall defined by a locus of lines parallel to said radial aperture and extending from the collet aperture only partially through the collet body and terminating without reaching the outer surface of the collet;
    a compressible member for mounting the pin within the collet aperture, said member including telescoping end portions each mounted within the undercut and a medial portion extending through the pin aperture, with the pin aperture being larger than the medial portion of the member to allow limited movement of the pin of locking and releasing the tool within the collet, whereby the member is compressible for mounting the member in the undercut portions.

5. A tool-retaining resilient collet comprising:
    a radially resilient body having an outer surface and a tool-receiving bore extending axially therethrough, said body having an aperture extending between the outer surface and said bore;
    a tool-securing pin having a head portion at one end thereof, and a tool-securing surface toward the other end thereof; and
    means for movably mounting the pin within the collet aperture, said means comprising:
    a recess cut into the collet body and only partially therethrough from the collet aperture providing a larger opening in the aperture mediate the collet bore and the collet outer surface said recess including an arcuate wall defined by a locus of lines parallel to said aperture and terminating prior to reaching the outer surface of the collet;
    a member compressible mounting the pin within the collet aperture including telescoping end portions mounted within the undercut and a medial portion extending through the pin aperture, said medial portion of the member being smaller than the pin aperture to allow limited movement of the pin for locking and releasing the tool within the collet.

6. A resilient collet of the type described in claim 5 wherein said recess includes a pair of opposed arcuately shaped sections milled into, but not through, the collet wall.

* * * * *